Inventors
FRANK E. PFEIFFER,
WILLIAM C. PFEIFFER,

By Toulmin & Toulmin
Attorneys

Sept. 29, 1931.  F. E. PFEIFFER ET AL  1,825,418
MOTOR CONTROL AND DRIVE
Filed Jan. 11, 1930   3 Sheets-Sheet 2
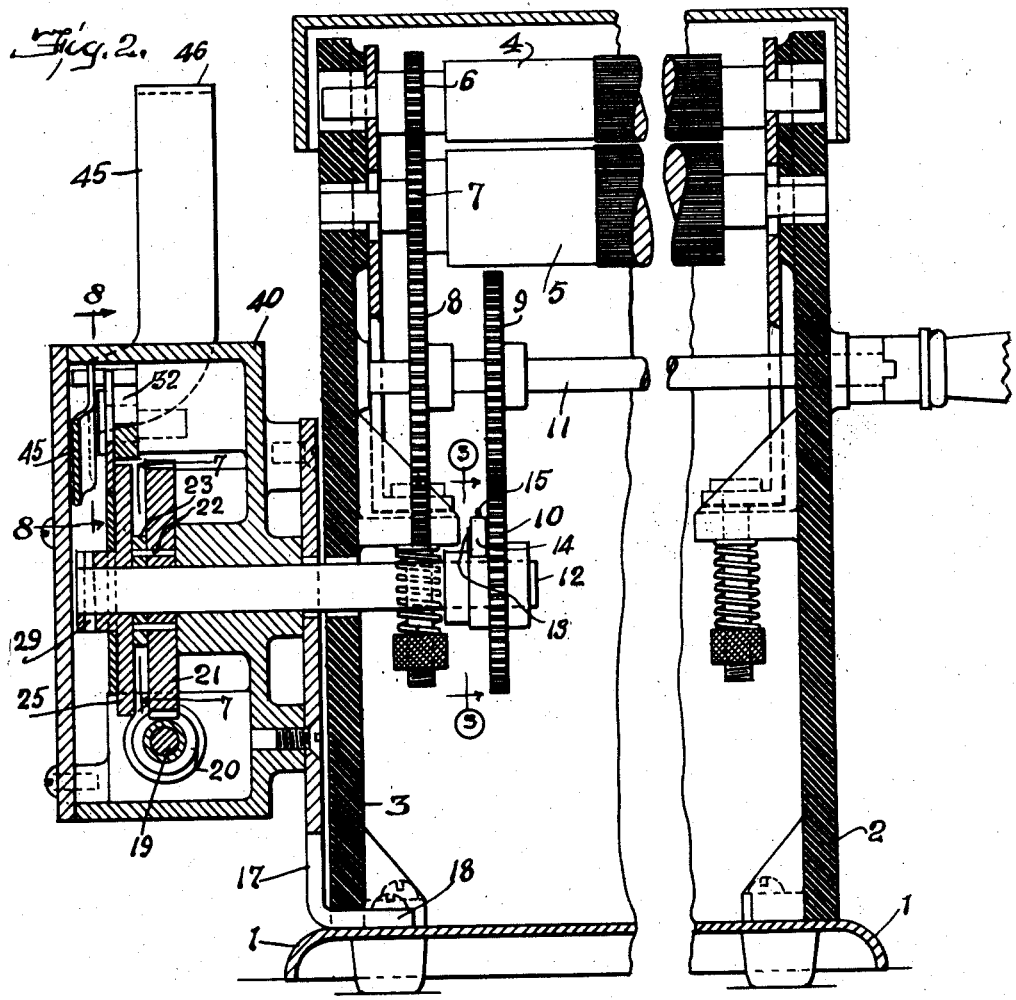
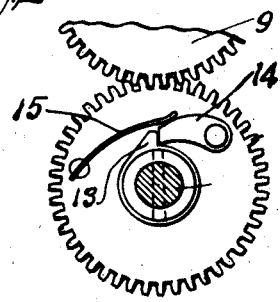
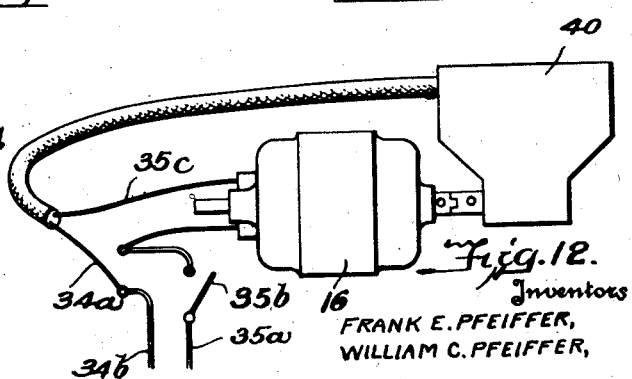
Inventors
FRANK E. PFEIFFER,
WILLIAM C. PFEIFFER,

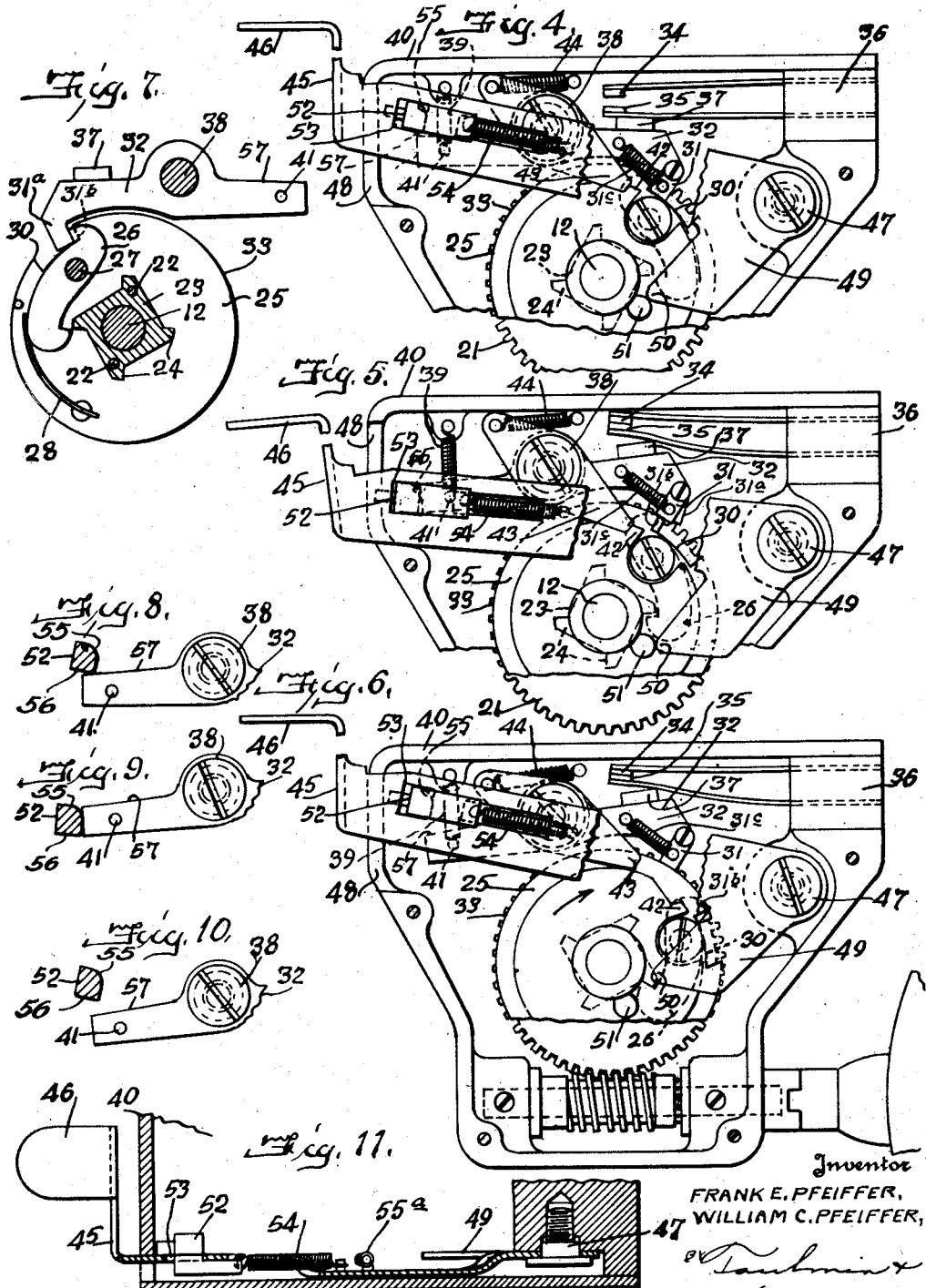

Patented Sept. 29, 1931

1,825,418

UNITED STATES PATENT OFFICE

FRANK E. PFEIFFER AND WILLIAM C. PFEIFFER, OF DAYTON, OHIO, ASSIGNORS TO THE EGRY REGISTER COMPANY, OF DAYTON, OHIO, A CORPORATION OF OHIO

MOTOR CONTROL AND DRIVE

Application filed January 11, 1930. Serial No. 420,267.

This invention relates to a motor operated drive and a control therefor.

It is a special object of this invention to provide a motor control which, when once initiated, will run through a complete cycle of operations and will then come to rest, it being impossible during the cycle to stop and start the motor and the cycle being positively terminated by a part of the motor driven apparatus.

This invention is particularly adaptable to the issuing of predetermined lengths of sheets from autographic registers and the like.

Referring to the drawings:

Figure 2 is a section on the line 2—2 of Figure 1;

Figure 3 is a section on the line 3—3 of Figure 2;

Figure 4 is a side elevation of the motor driven apparatus with the switch open and the parts at rest;

Figure 5 is a similar view with the switch closed and the parts starting to operate but with the handle in depressed position;

Figure 6 is a similar view with the parts in operation but the handle having returned to its initial position;

Figure 7 is a section on the line 7—7 of Figure 2;

Figure 8 is a section on the line 8—8 of Figure 2 showing the position of the latch prior to the depression of the operating handle;

Figure 9 is a similar view showing the parts as the handle is passing by the latch;

Figure 10 is a similar view showing the parts with the handle below the latch;

Figure 11 is a section on the line 11—11 of Figure 1 showing in plan view the operating handle and latching mechanism.

Figure 12 shows a diagram of the electrical connections.

Figure 1:
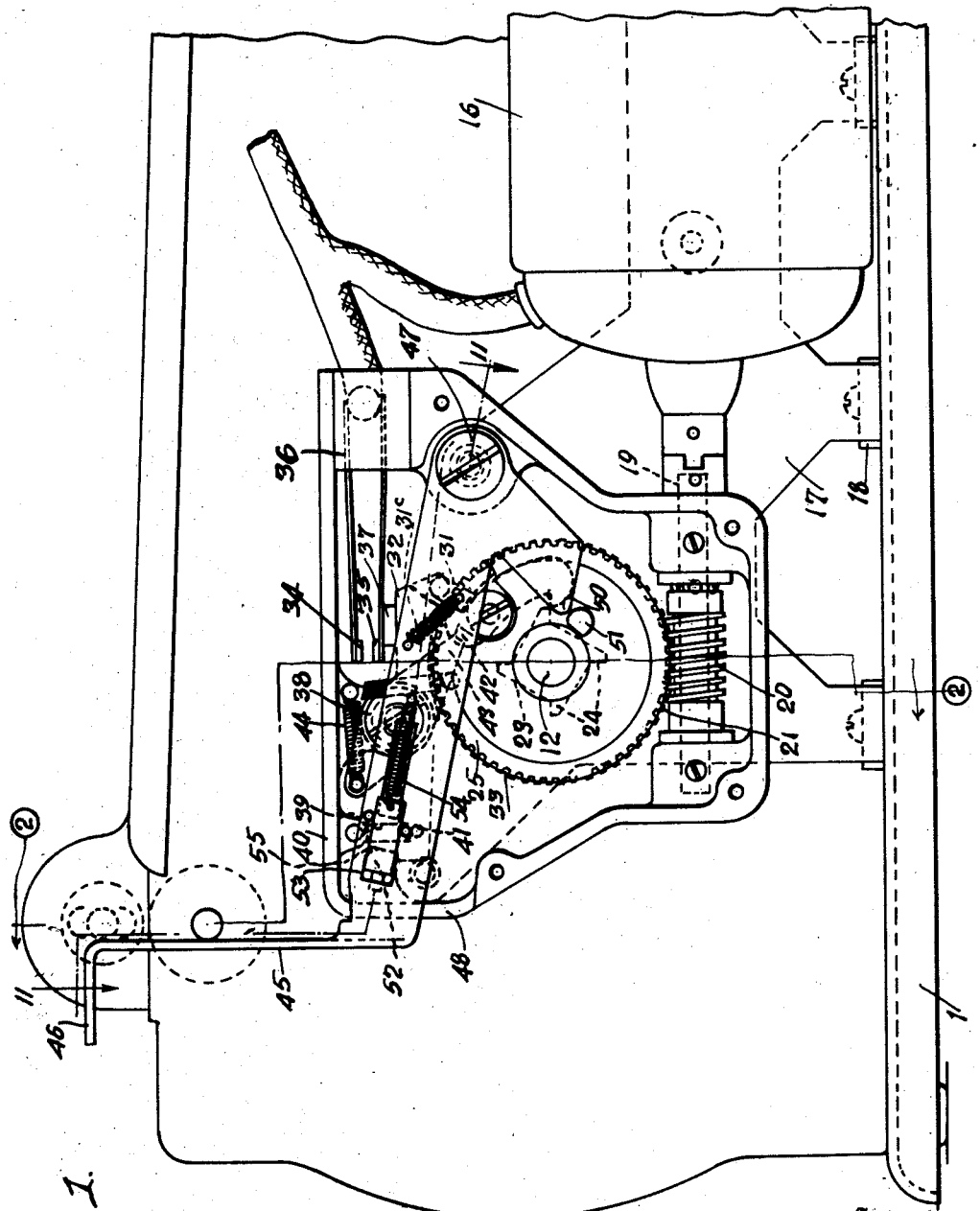
Figure 1 is a side elevation of the motor, the apparatus driven by the motor with the cover removed and the outline of a typical autographic register.

Referring to the drawings in detail, it will be understood that this invention is adaptable to any type of apparatus and it is merely shown in connection with an autographic register in order to indicate a typical application where this invention will be useful.

In the drawings, 1 is the base of an autographic register having side walls 2 and 3. The register is provided with the usual paper sheet ejecting rolls 4 and 5 which are driven through the gears 6, 7, 8, 9 and 10.

Gears 8 and 9 are mounted upon a common shaft 11. The gear 10 is mounted upon the driven shaft 12 which has mounted thereon a locking detent 13 for engagement with the pawl 14 carried by the gear 10. This pawl is held in locking engagement by the spring 15 carried by the gear 10. The motor 16 is carried upon the bracket 17 which in turn is mounted on the ears 18 upon the bottom 1 of the register. This motor drives the worm shaft 19 having the worm 20 for engagement with a worm gear 21. This worm gear 21 has pinned thereto by the pins 22 a detent 23 having four teeth 24. Both the gear 21 and the detent 23 which is pinned to it are mounted upon the shaft 12 and turn with it only when connected to the cam disk 25 through the agency of the locking pawl 26 that is pivoted at 27 on this disk. A spring 28 normally tends to engage the locking pawl 27 with one of the teeth 24 of the detent 23 to bring about the engagement between the power driven gear 21 on the one hand and the disk 25 with the shaft 12 on the other hand. The disk 25 is pinned to the shaft 12 by the pin 29. The disk has a cutaway slot 30 into which the pivoted nose 31 of the locking arm 32 is adapted to drop to thus depress one end of the locking pawl 26 to maintain it out of engagement with one of the teeth 24 of the detent 23. A sta ry nose 31a also enters the slot and
res the shoulder 31b. The spring 31c
s to pull the finger 31 to a point to rest
e periphery of the disc 25 before the
 starts to move. (See Fig. 5). The
ng nose 31 is elevated so that it will ride
 the outside surface of the cam disk 25
; 33 thus permitting the spring 28 to
 the locking finger 26 into engagement
 the teeth 24 of the detent 23 and the
 12 with the driven gear 21. This will
t in the actuation of the rolls 4 and 5
e paper sheets.
 order to start the motor, the switch
bers 34 and 35 must be closed. They
upported in the insulation block 36. To
 them, the shoulder 37 of the locking
 32 engages the under side of the contact
ber 35 bringing that contact member in
gement with the contact member 34 as
igures 5 and 6 and hold such members
hat position until the end of the cycle
perations.
igure 12 shows diagrammatically the
tric wiring for operating the motor and
cut-off mechanism. The conductor 35a
nds through a switch 35b to the motor
 from the motor through a connection
to the contact member 35 in the casing
 The contact member 34, which is
pted to contact with the contact member
has extending therefrom a conductor 34a,
ch is connected to the line 34b. The lines
 and 35a are connected to some suitable
rce of electrical current. Whenever the
tch 35b is closed the motor will operate
long as the contacts 34 and 35 are in
agement with each other, but when this
tact between 34 and 35 is broken the
tor will stop and remain stationary until
se contacts are brought together again.
The locking arm 32 is pivoted at 38. It is
mally held in the position shown in Fig-
s 4 and 6 by the spring 39 which is at-
hed to the casing 40 at one end and to
 locking arm at 41 at the other end.
The disk 25 is provided with a shouldered
ojection 42 that is engaged by a rocking
tent 43 carried on the casing 40 that is
ring pressed by the spring 44 into engage-
nt with the shoulder 42. This prevents
ckward movement of the disk 25 and its
ociated mechanism.
The operating mechanism to initiate the
cle of operations comprises a handle 45
th a thumb piece 46. This handle is piv-
ed at 47 on the casing 40. It is adapted
 be depressed until it reaches the bottom
 the slot 48 in the casing 40. The handle
so carries an angular extension known as
 kickout unlocking arm designated 49.
his arm is provided with a cam nose 50
at engages with a pin 51 carried on the
tside of the disk 25. The function of this kickout pin and kickout arm will be
explained hereinafter.
The handle 45 is provided with a recipro-
cating latch having a transversely extending
nose 52. The latch reciprocates in the slot
53. It is spring operated by the spring 54.
This latch 52 has a cam-shaped surface 55 on
its upper side. Its lower edge 56 is flat so
that it will engage with the upper side 57
of the locking arm 32 thereby carrying the
arm downwardly when the handle 45 moves
downwardly until the locking arm is in
locked position as in Figures 5 and 6 by
reason of the locking finger 31 riding on the
surface 33 of the disk 25, whereupon the
handle 45 can return upwardly under the
influence of its spring 55a and will be per-
mitted to do so by having the cam surface
55 slide over the end of the arm 32.
The pin 51 as it travels in a clockwise
direction engages the kickout arm 49 and
compels a complete downward stroke of the
arm 45 to thus insure the parts moving into
locked contact making position for a full
cycle of operations so that a partial move-
ment of the handle 45 will not be possible.

Method of operation

In operation, the handle 45 is depressed
thereby carrying with it the locking arm 32.
The nose 31 of the arm 32 is permitted to
ride upon the surface 33 of the disk 25.
The spring 28 forces the locking finger 26
into engagement with the tooth 24 of the
detent 23 thereby connecting the gear 21
to the shaft 12.

Simultaneously the shoulder 37 of the
locking arm 32 closes the contacts 34 and
35 starting up the motor 16. This results in
the moving of the disk 25 and the pin 51
causing the handle 45 to complete its descent
for a full stroke. The parts thus continue
to operate through the cycle of operations
until the nose 31 is permitted to drop down
into the slot 30 disconnecting the finger 26
from the tooth 24 and likewise disconnect-
ing the contact members 34 and 35 which
are spring members and spring apart when
released. The movement of the handle 45
downwardly serves to actuate the locking
arm 32 in one direction but upon a return
of the handle it does not actuate the locking
arm because the latch 52 slips by the locking
arm 32 without disturbing it when the move-
ment is in an upward direction.

Thus, there is provided a source of motive
power, a driven shaft, a clutch between the
driven shaft and motive power, a switch
closed when the clutch is closed, means to
hold the clutch and switch closed for a cycle
of operations, an operating handle operable
in one direction only, and means to compel
a full stroke of the operating handle before
release.

It will be understood that we desire to comprehend within our invention such modifications as may be necessary to adapt it to varying conditions and uses.

Having thus fully described our invention, what we claim as new and desire by Letters Patent to secure, is:

1. In combination, a motor, means to be driven by said motor, means to connect the driven means to the motor, a locking arm adapted to maintain said connecting means inoperative when the motor is at rest and to cause it to operate when the motor is operated, means on said locking arm for closing a switch to operate said motor, a switch therefor, an operating handle for said locking arm, and means on said handle to cause the handle to move the locking arm into switch closing position and adapted to slip by the locking arm for the handle to return to its initial position without disturbing the locking arm.

2. In combination, a motor, means to be driven by said motor, means to connect the driven means to the motor, a locking arm adapted to maintain said connecting means inoperative when the motor is at rest and to cause it to operate when the motor is operated, means on said locking arm for closing a switch to operate said motor, a switch therefor, an operating handle for said locking arm, and means on said handle to cause the handle to move the locking arm into switch closing position and adapted to slip by the locking arm for the handle to return to its initial position without disturbing the locking arm, and means associated with said driven means for moving said handle a complete stroke to insure the closing of said switch and the connection of the motor with the driven means.

3. In combination, a motor, a driven shaft, a loosely mounted gear and detent thereon, a cam disk having a slot in the periphery fixed to said shaft, a latch member adapted to engage said detent mounted on said disk, yielding means for moving said latch into engagement with the detent, a rocking arm extending into said slot to maintain said latch in inoperative position, means to move said locking arm from said slot to let it rest on the periphery of said disk, a switch for operating said motor, means on the locking arm for closing said switch to rotate said disk while the locking arm is out of the slot, a pivoted finger on the locking arm, a spring to retract it to mount it on said disc prior to the movement thereof.

4. In combination, a motor, a driven shaft, a loosely mounted gear and detent thereon, a cam disk having a slot in the periphery fixed to said shaft, a latch member adapted to engage said detent mounted on said disk, yielding means for moving said latch into engagement with the detent, a rocking arm extending into said slot to maintain said latch in inoperative position, means to move said locking arm from said slot to let it rest on the periphery of said disk, a switch for operating said motor, means on the locking arm for closing said switch to rotate said disk while the locking arm is out of the slot, an operating handle having a latch member thereon for operating said locking arm, a pivoted finger on the locking arm, a spring to retract it to mount it on said disk prior to the movement thereof.

5. In combination, a motor, a driven shaft, a loosely mounted gear and detent thereon, a cam disk having a slot in the periphery fixed to said shaft, a latch member adapted to engage said detent mounted on said disk, yielding means for moving said latch into engagement with the detent, a rocking arm extending into said slot to maintain said latch in inoperative position, means to move said locking arm from said slot to let it rest on the periphery of said disk, a switch for operating said motor, means on the locking arm for closing said switch to rotate said disk while the locking arm is out of the slot, an operating handle for operating said locking arm, and means on said handle for moving it through a complete stroke and holding it until said locking arm shall ride upon the periphery of said disk.

6. In combination, a motor, a driven shaft, a loosely mounted gear and detent thereon, a cam disk having a slot in the periphery fixed to said shaft, a latch member adapted to engage said detent mounted on said disk, yielding means for moving said latch into engagement with the detent, a rocking arm extending into said slot to maintain said latch in inoperative position, means to move said locking arm from said slot to let it rest on the periphery of said disk, a switch for operating said motor, means on the locking arm for closing said switch to rotate said disk while the locking arm is out of the slot, an operating handle for operating said locking arm, and means on said handle for moving it through a complete stroke and holding it until said locking arm shall ride upon the periphery of said disk, and yielding means to maintain said handle to its initial position.

7. In combination, a motor, a driven shaft, a loosely mounted gear and detent thereon, a cam disk having a slot in the periphery fixed to said shaft, a latch member adapted to engage said detent mounted on said disk, yielding means for moving said latch into engagement with the detent, a rocking arm extending into said slot to maintain said latch in inoperative position, means to move said locking arm from said slot to let it rest on the periphery of said disk, a switch for operating id motor, means on the locking arm for closing said switch to rotate said disk while the locking arm is out of the slot, an operating handle for operating said locking arm, means on said handle for moving it through complete stroke and holding it until said locking arm shall ride upon the periphery of said disk, and yielding means to maintain said handle to its initial position, means on said handle for moving said locking arm in one direction of movement of the handle but not disturbing it when moved the other direction.

8. In combination, a motor, a driven shaft, loosely mounted gear and detent thereon, a cam disk having a slot in the periphery fixed to said shaft, a latch member adapted to engage said detent mounted on said disk, yielding means for moving said latch into engagement with the detent, a locking arm extending into said slot to maintain said latch in inoperative position, means to move said locking arm from said slot to let it rest on the periphery of said disk, a switch for operating said motor, means on the locking arm for closing said switch to rotate said disk while the locking arm is out of the slot, an operating handle for operating said locking arm, means on said handle for moving it through a complete stroke and holding it until said locking arm shall ride upon the periphery of said disk, and yielding means to maintain said handle to its initial position, means on said handle for moving said locking arm in one direction of movement of the handle but not disturbing it when moved in the other direction, a shoulder on said disk and yieldingly mounted pawl engaging therewith to prevent backward movement of the disk against said pawl.

9. In combination, a motor having an electric circuit, a shaft, a worm and worm shaft driven thereby, a driven shaft, a gear and detent mounted thereon loosely, a disk having a cutaway portion therein fixed to said shaft, a spring pressed latch to engage said detent pivoted on said disk having one end adjacent the cutaway portion of said disk, a locking arm, a pivoted finger thereon yieldingly depressing said latch when said finger is in the cutaway portion of said disk and when not in said portion adapted to ride on the periphery of said disk, a switch in said circuit on the other side of said locking arm from said disk adapted to be closed by said locking arm when said finger is moved to ride on the periphery of said disk.

10. In combination, a motor having an electric circuit, a shaft, a worm and worm shaft driven thereby, a driven shaft, a gear and detent mounted thereon loosely, a disk having a cutaway portion therein fixed to said shaft, a spring pressed latch to engage said detent pivoted on said disk having one end adjacent the cutaway portion of said disk, a locking arm, a pivoted finger thereon yieldingly depressing said latch when said finger is in the cutaway portion of said disk and when not in said portion adapted to ride on the periphery of said disk, a switch in said circuit on the other side of said locking arm from said disk adapted to be closed by said locking arm when said finger is moved to ride on the periphery of said disk, an actuating handle having means thereon for moving said locking arm with its pivoted finger in one direction and adapted to return to its initial position without disturbing said locking arm, and yielding means for so returning it.

11. In combination, a motor having an electric circuit, a shaft, a worm and worm shaft driven thereby, a driven shaft, a gear and detent mounted thereon loosely, a disk having a cutaway portion therein fixed to said shaft, a spring pressed latch to engage said detent pivoted on said disk having one end adjacent the cutaway portion of said disk, a locking arm, a pivoted finger thereon yieldingly depressing said latch when said finger is in the cutaway portion of said disk and when not in said portion adapted to ride on the periphery of said disk, a switch in said circuit on the other side of said locking arm from said disk adapted to be closed by said locking arm when said finger is moved to ride on the periphery of said disk, an actuating handle having means thereon for moving said locking arm with its pivoted finger in one direction and adapted to return to its initial position without disturbing said locking arm, yielding means for so returning it, a pin on said disk, and a kickout arm on said handle whereby the movement of the disk when initiated will compel a complete movement of said handle for the completion of a cycle of operations before said handle can be returned to its initial position.

12. In combination, a motor having an electric circuit, a shaft, a worm and worm shaft driven thereby, a driven shaft, a gear and detent mounted thereon loosely, a disk having a cutaway portion fixed to said shaft, a spring pressed latch pivoted on said disk having one end adjacent a cutaway portion of said disk, a locking arm, a pivoted finger thereon yieldingly depressing said latch when said finger is in the cutaway portion of said disk and when not in said portion adapted to ride on the periphery of said disk, a switch in said circuit on the other side of said locking arm from said disk adapted to be closed by said locking arm when said finger is moved to ride on the periphery of said disk, an actuating handle having means thereon for moving said locking arm with its pivoted finger in one direction and adapted to return to its initial position without disturbing said locking arm, and yielding means for so returning it, a pin on said disk, a kickout arm on said handle whereby the movement of the disk when initiated will compel a complete movement of said handle for the completion of a cycle of operations before said handle can be returned to its initial position, and means associated with said disk for preventing its turning backwardly.

In testimony whereof, we affix our signatures.

FRANK E. PFEIFFER.
WILLIAM C. PFEIFFER.